(12) United States Patent
Akasaka et al.

(10) Patent No.: US 11,032,004 B1
(45) Date of Patent: Jun. 8, 2021

(54) OPTICAL SYSTEM FOR COMPENSATING FOR SIGNAL LOSS

(71) Applicant: Fujitsu Limited, Kawasaki (JP)

(72) Inventors: Youichi Akasaka, Plano, TX (US); Tadashi Ikeuchi, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 16/744,908

(22) Filed: Jan. 16, 2020

(51) Int. Cl.
*H04B 10/2507* (2013.01)
*H04J 14/02* (2006.01)
*H04B 10/079* (2013.01)
*H04B 10/25* (2013.01)

(52) U.S. Cl.
CPC ..... *H04B 10/2507* (2013.01); *H04B 10/0795* (2013.01); *H04B 10/0797* (2013.01); *H04B 10/25891* (2020.05); *H04J 14/02* (2013.01)

(58) Field of Classification Search
CPC .......... H04B 10/2507; H04B 10/25891; H04B 10/0795; H04B 10/0797; H04J 14/02
USPC .......................................................... 398/29
See application file for complete search history.

(56) References Cited

U.S. PATENT DOCUMENTS

| | | | | |
|---|---|---|---|---|
| 7,933,063 | B2 * | 4/2011 | Onaka | H04B 10/2916 359/334 |
| 9,641,252 | B2 * | 5/2017 | Nijhof | H04B 10/293 |
| 10,547,404 | B1 * | 1/2020 | Al Sayeed | H04B 10/0797 |
| 2017/0005727 | A1 * | 1/2017 | Kachita | H04B 10/07955 |

* cited by examiner

*Primary Examiner* — Mohammad R Sedighian
(74) *Attorney, Agent, or Firm* — Baker Botts L.L.P.

(57) ABSTRACT

An optical system including a forward and a backward Raman pump module positioned along a transmission fiber; a noise matrix computing module configured to: determine, for first gains of the optical signal, a first noise associated with the first gain of the forward Raman pump; determine, for second gains of the optical signal, a second noise associated with the second gain of the backward Raman pump module; generate a noise matrix based on i) the first noise for each first gain of the forward Raman pump module and ii) the second noise for each second gain of the backward Raman pump module; identify a span loss of the optical signal as the optical signal is transmitted along the transmission fiber; identify a combination of a particular first gain of the forward Raman pump module and a particular second gain of the backward Raman pump module.

18 Claims, 5 Drawing Sheets

| GAIN (dB) | FORWARD RAMAN | BACKWARD RAMAN | EDFA |
|---|---|---|---|
| 13 | 3.22 | 9.29 | 39.4 |
| 12 | 2.39 | 7.22 | 31.1 |
| 11 | 1.73 | 5.57 | 24.6 |
| 10 | 1.21 | 4.26 | 19.3 |
| 9 | 0.798 | 3.22 | 15.2 |
| 8 | 0.469 | 2.39 | 11.9 |
| 7 | 0.208 | 1.73 | 9.29 |
| 6 |  | 1.21 | 7.22 |
| 5 |  | 0.798 | 5.57 |
| 4 |  |  | 4.26 |

OPTICAL SYSTEM FOR COMPENSATING FOR SIGNAL LOSS

BACKGROUND

Field of the Disclosure

The present disclosure relates generally to optical communication networks and, more particularly, to an optical system for compensating for signal loss.

Description of the Related Art

Telecommunication, cable television and data communication systems use optical networks to rapidly convey large amounts of information between remote points. In an optical network, information is conveyed in the form of optical signals through optical fibers. Optical fibers may comprise thin strands of glass capable of communicating the signals over long distances. Optical networks often employ modulation schemes to convey information in the optical signals over the optical fibers. Such modulation schemes may include phase-shift keying (PSK), frequency-shift keying (FSK), amplitude-shift keying (ASK), and quadrature amplitude modulation (QAM). Optical networks may also include various optical elements, such as amplifiers, dispersion compensators, multiplexer/demultiplexer filters, wavelength selective switches (WSS), optical switches, couplers, etc. to perform various operations within the network.

Erbium-doped fiber amplifiers (EDFAs) have widespread use in optical systems. However, EDFAs can have inherent noisy characteristics that can prevent high level modulation formats such as 256 QAM from longer optical transmission (e.g., greater than 80 kilometers).

SUMMARY

Innovative aspects of the subject matter described in this specification may be embodied in an optical system for compensating for signal loss, comprising: a transmission fiber to transmit a WDM input optical signal; a forward Raman pump module positioned along the transmission fiber; a backward Raman pump module positioned along the transmission fiber; and a noise matrix computing module configured to: determine, for one or more first gains of the optical signal, a first noise associated with the first gain of the forward Raman pump; determine, for one or more second gains of the optical signal, a second noise associated with the second gain of the backward Raman pump module; generate a noise matrix based on i) the first noise for each first gain of the forward Raman pump module and ii) the second noise for each second gain of the backward Raman pump module; identify a span loss of the optical signal as the optical signal is transmitted along the transmission fiber; and identify, based on the noise matrix and the span loss, a combination of a particular first gain of the forward Raman pump module and a particular second gain of the backward Raman pump module, wherein the forward Raman pump module and the backward Raman pump module compensate for the span loss of the optical signal based on the combination of the particular first gain of the forward Raman pump module and the particular second gain of the backward Raman pump module, wherein a gain ratio between the particular first gain of the forward Raman pump module and the particular second gain of the backward Raman pump module includes a smallest accumulated noise combination of the first noise and the second noise of the optical signal based on the noise matrix.

Other embodiments of these aspects include corresponding methods, apparatus, and computer programs, configured to perform the actions of the methods, encoded on computer storage devices.

These and other embodiments may each optionally include one or more of the following features. For instance, an optical amplifier positioned along the transmission fiber; and a receiver configured to receive the optical signal, wherein the noise matrix computing module is further configured to: determine, for one or more third gains of the optical signal, a third noise associated with the third gain of the optical amplifier; generate the noise matrix based on i) the first noise for each first gain of the forward Raman pump module, ii) the second noise for each second gain of the backward Raman pump module, and ii) the third noise for each third gain of the optical amplifier; identify a receiver sensitivity of the receiver; and identify, based on the noise matrix and the receiver sensitivity, a combination of a particular second gain of the backward Raman pump module and a particular third gain of the optical amplifier; wherein the backward Raman pump module and the optical amplifier compensate for the receiver sensitivity of the receiver based on the combination of the particular second gain of the backward Raman pump module and the particular third gain of the optical amplifier. A gain ratio between the particular second gain of the backward Raman pump module and the particular third gain of the optical amplifier includes a smallest accumulated noise combination of the second noise and the third noise of the optical signal based on the noise matrix. The optical amplifier is an EDFA. An additional transmission fiber to transmit the optical signal; an additional forward Raman pump module positioned along the additional transmission fiber; and an additional backward Raman pump module positioned along the additional transmission fiber, wherein the noise matrix computing module is further configured to: determine, for one or more third gains of the optical signal, a third noise associated with the third gain of the additional forward Raman pump; determine, for one or more fourth gains of the optical signal, a fourth noise associated with the fourth gain of the additional backward Raman pump module; generate the noise matrix based on i) the third noise for each third gain of the additional forward Raman pump module and ii) the fourth noise for each fourth gain of the additional backward Raman pump module; identify an additional span loss of the optical signal as the optical signal is transmitted along the additional transmission fiber; identify, based on the noise matrix and the additional span loss, a combination of a particular third gain of the additional forward Raman pump module and a particular fourth gain of the additional backward Raman pump module; wherein the additional forward Raman pump module and the additional backward Raman pump module compensate for the additional span loss of optical signal based on the combination of the particular third gain of the additional forward Raman pump module and the particular fourth gain of the additional backward Raman pump module, wherein a gain ratio between the particular third gain of the additional forward Raman pump module and the particular fourth gain of the additional backward Raman pump module includes a smallest accumulated noise combination of the third and the fourth noise of the optical signal based on the noise matrix.

An optical amplifier positioned along the additional transmission fiber; and a receiver configured to receive the optical signal, wherein the noise matrix computing module is further configured to: determine, for one or more fifth gains of the optical signal, a fifth noise associated with the fifth gain of the optical amplifier; generate the noise matrix based on i) the third noise for each third gain of the additional forward Raman pump module, ii) the fourth noise for each fourth gain of the additional backward Raman pump module, and ii) the fifth noise for each gain of the optical amplifier; identify a receiver sensitivity of the receiver; and identify, based on the noise matrix and the receiver sensitivity, a combination of a particular third gain of the additional backward Raman pump module and a particular fifth gain of the optical amplifier; wherein the additional backward Raman pump module and the optical amplifier compensate for the receiver sensitivity of the receiver based on the combination of the third gain of the additional backward Raman pump module and the fifth gain of the optical amplifier. A gain ratio between the particular third gain of the additional backward Raman pump module and the particular fifth gain of the optical amplifier includes a smallest accumulated noise combination of the third noise and the fifth noise of the optical signal based on the noise matrix. The span loss is approximately 20 dB. The receiver sensitivity is approximately 10 dB.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Figure 1:
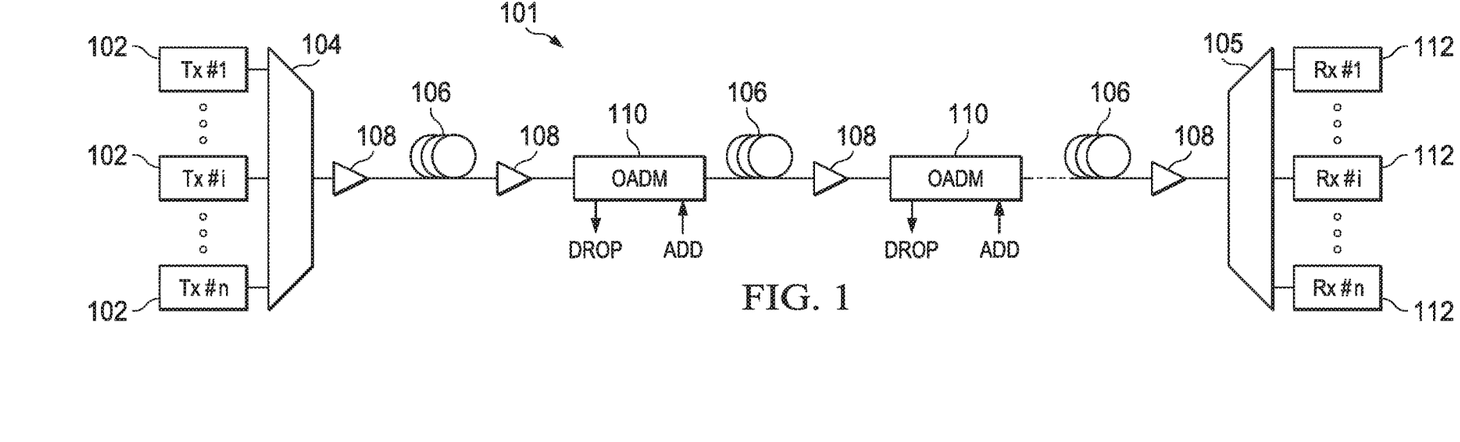
FIG. 1 is a block diagram of selected elements of an embodiment of an optical network.

Referring now to the drawings, FIG. 1 illustrates an example embodiment of optical network 101, which may represent an optical communication system. Optical network 101 may include one or more optical fibers 106 to transport one or more optical signals communicated by components of optical network 101. The network elements of optical network 101, coupled together by fibers 106, may comprise one or more transmitters 102, one or more multiplexers (MUX) 104, one or more optical amplifiers 108, one or more optical add/drop multiplexers (OADM) 110, one or more demultiplexers (DEMUX) 105, and one or more receivers 112.

Optical network 101 may comprise a point-to-point optical network with terminal nodes, a ring optical network, a mesh optical network, or any other suitable optical network or combination of optical networks. Optical network 101 may be used in a short-haul metropolitan network, a long-haul inter-city network, or any other suitable network or combination of networks. The capacity of optical network 101 may include, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a Single-Mode Fiber (SMF), Enhanced Large Effective Area Fiber (E-LEAF), or TrueWave® Reduced Slope (TW-RS) fiber.

Optical network 101 may include devices to transmit optical signals over optical fibers 106. Information may be transmitted and received through optical network 101 by modulation of one or more wavelengths of light to encode the information on the wavelength. In optical networking, a wavelength of light may also be referred to as a channel that is included in an optical signal. Each channel may carry a certain amount of information through optical network 101.

To increase the information capacity and transport capabilities of optical network 101, multiple signals transmitted at multiple channels may be combined into a single wideband optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical network 101 may transmit disparate channels using WDM or some other suitable multi-channel multiplexing technique, and to amplify the multi-channel signal.

Optical network 101 may include one or more optical transmitters (Tx) 102 to transmit optical signals through optical network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical network 101.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical network 101. Optical amplifiers 108 may be positioned before or after certain lengths of fiber 106. Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of an optical pump to excite the atoms of the doped portion of the optical fiber, which increases the intensity of the optical signal. As an example, optical amplifiers 108 may comprise an erbium-doped fiber amplifier (EDFA).

OADMs 110 may be coupled to optical network 101 via fibers 106. OADMs 110 comprise an add/drop module, which may include a system, apparatus or device to add and drop optical signals (for example at individual wavelengths) from fibers 106. After passing through an OADM 110, an optical signal may travel along fibers 106 directly to a destination, or the signal may be passed through one or more additional OADMs 110 and optical amplifiers 108 before reaching a destination.

In certain embodiments of optical network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) that may be included in a ROADM. ROADMs are considered 'colorless' when the ROADM is able to add/drop any arbitrary wavelength. ROADMs are considered 'directionless' when the ROADM is able to add/drop any wavelength regardless of the direction of propagation. ROADMs are considered 'contentionless' when the ROADM is able to switch any contended wavelength (already occupied wavelength) to any other wavelength that is available.

As shown in FIG. 1, optical network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical network 101 may transmit and carry a forty (40) channel DWDM signal. Demultiplexer 105 may divide the single, forty channel DWDM signal into forty separate signals according to the forty different channels.

In FIG. 1, optical network 101 may also include receivers 112 coupled to demultiplexer 105. Each receiver 112 may receive optical signals transmitted at a particular wavelength or channel, and may process the optical signals to obtain (e.g., demodulate) the information (i.e., data) that the optical signals contain. Accordingly, network 101 may include at least one receiver 112 for every channel of the network.

Optical networks, such as optical network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

Additionally, polarization division multiplexing (PDM) technology may enable achieving a greater bit rate for information transmission. PDM transmission comprises independently modulating information onto different polarization components of an optical signal associated with a channel. In this manner, each polarization component may carry a separate signal simultaneously with other polarization components, thereby enabling the bit rate to be increased according to the number of individual polarization components. The polarization of an optical signal may refer to the direction of the oscillations of the optical signal. The term "polarization" may generally refer to the path traced out by the tip of the electric field vector at a point in space, which is perpendicular to the propagation direction of the optical signal.

In an optical network, such as optical network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, and an operational support system (OSS) which handles network-wide operations.

Modifications, additions or omissions may be made to optical network 101 without departing from the scope of the disclosure. For example, optical network 101 may include more or fewer elements than those depicted in FIG. 1. Also, as mentioned above, although depicted as a point-to-point network, optical network 101 may comprise any suitable network topology for transmitting optical signals such as a ring, a mesh, and a hierarchical network topology.

As discussed above, the amount of information that may be transmitted over an optical network may vary with the number of optical channels coded with information and multiplexed into one signal. Accordingly, an optical fiber employing a WDM signal may carry more information than an optical fiber that carries information over a single channel. Besides the number of channels and number of polarization components carried, another factor that affects how much information can be transmitted over an optical network may be the bit rate of transmission. The higher the bit rate, the greater the transmitted information capacity. Achieving higher bit rates may be limited by the availability of wide bandwidth electrical driver technology, digital signal processor technology and increase in the optical signal noise ratio (OSNR) for transmission over optical network 101.

Current designs for optical amplifiers may include optical phase-sensitive amplifiers (PSA). A typical phase-sensitive optical amplifier will have different stages, including an idler stage to initially generate an idler signal using an optical pump and an amplification stage to amplify the input signal using the optical pump and the idler signal. In between the idler stage and the amplification stage, an intermediate stage may be implemented in the phase-sensitive optical amplifier. The intermediate stage may involve complex signal processing and pump power recovery to adjust the power level of the input signal and the idler signal. In typical phase-sensitive optical amplifiers, the optical paths of the input signal, the optical pump, and the idler signal may be separated in the intermediate stage in order to independently modulate power of each of the signals.

Figure 2:
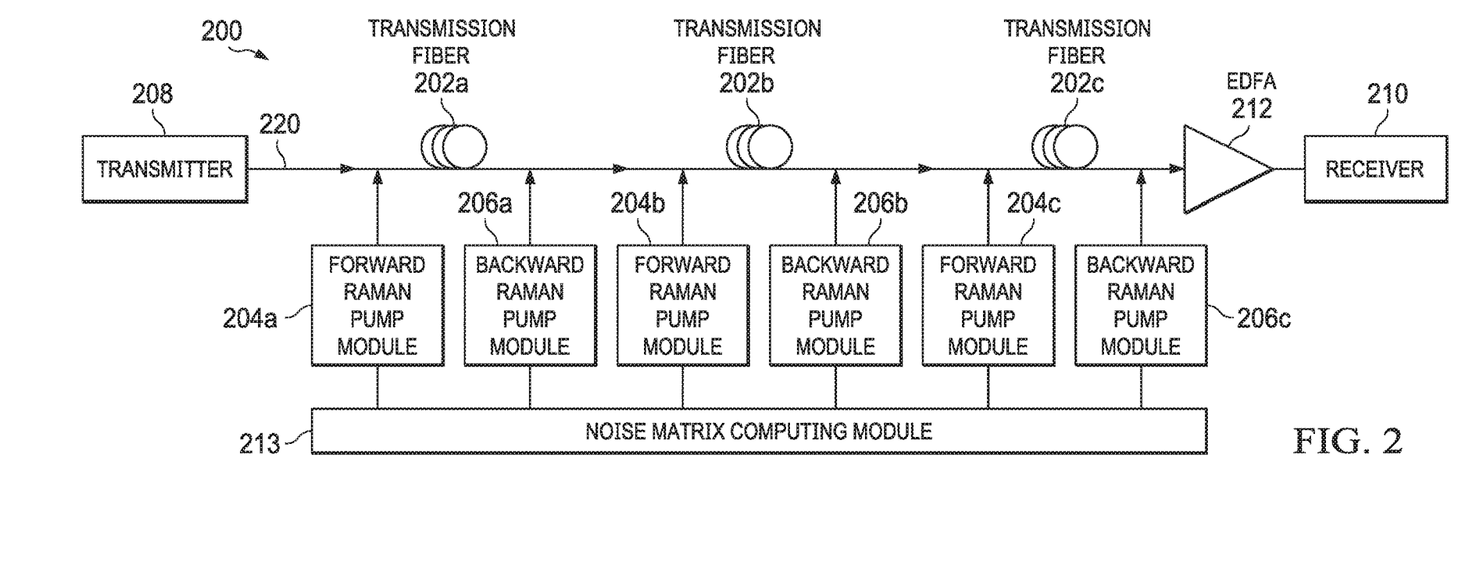
FIG. 2 is a block diagram of selected elements of an embodiment of an optical system for compensating for signal loss in an optical system.

FIG. 2 illustrates an optical system 200 for compensating for signal loss. The optical system 200 can include transmission fibers 202a, 202b, 202c (collectively referred to as transmission fibers 202); forward Raman pump modules 204a, 204b, 204c (collectively referred to as forward Raman pump modules 204); backward Raman pump modules 206a, 206b, 206c (collectively referred to as backward Raman pump modules 206); a transmitter 208; a receiver 210, an optical amplifier 212; and a noise matrix computing module 213. The noise matrix computing module 213 can be in communication with one or more of the forward Raman pump modules 204 and the backward Raman pump modules 206. The optical system 200 can include any portion or all of the optical network 101.

The transmitter 208 can transmit a wavelength-division multiplexing (WDM) input optical signal 220 along the transmission fibers 202. Each of the transmission fibers 202 can be associated with a span loss. In some examples, the span loss is approximately 20 dB. The forward Raman pump modules 204 and the backward Raman pump modules 206 can compensate for the span loss of the optical signal 220 as the optical signal 220 is transmitted along the transmission fibers 202.

Figure 3:
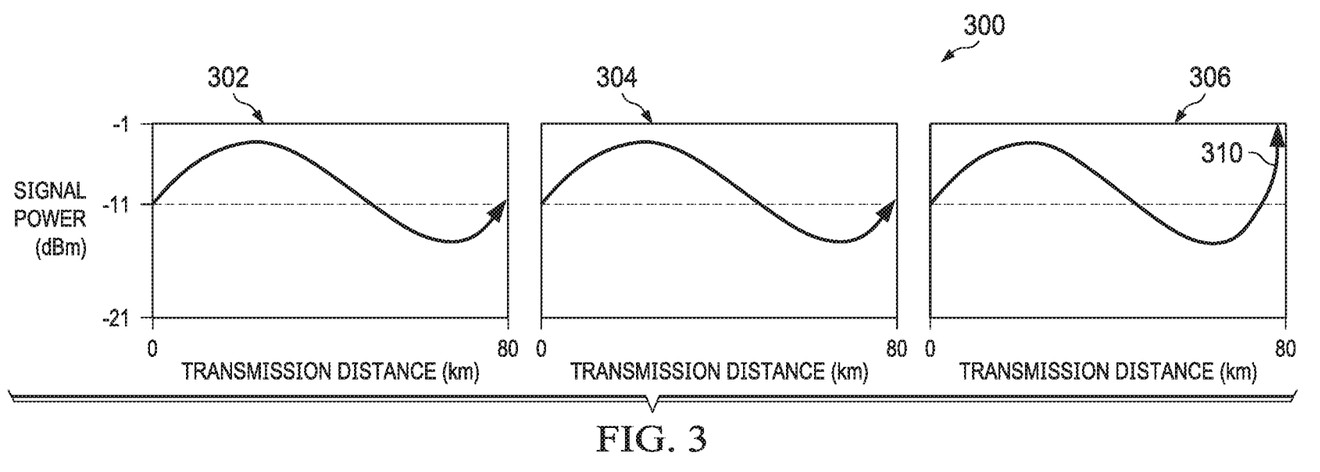
FIGS. 3, 4 illustrate graphs of a signal power of an optical signal as the optical signal is transmitted along a transmission fiber of the optical system.
Figure 4:
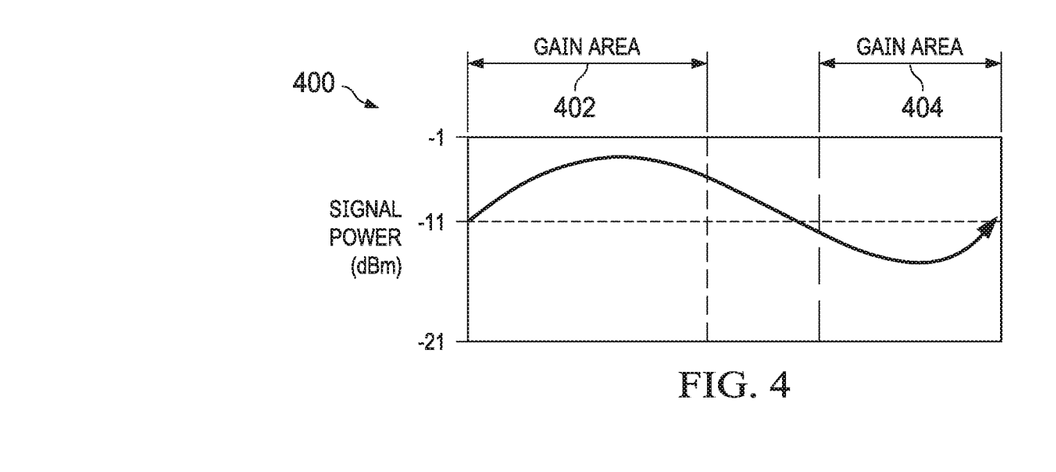

FIG. 3 illustrates an example graph 300 of a signal power of the optical signal 220 as the optical signal 220 is transmitted along the transmission fibers 202. Specifically, the X-axis illustrates a length of each transmission fiber 202 (e.g., 80 km span for each transmission fiber 202); the Y-axis illustrates the signal power of the optical signs 220 (e.g., from −1 dB to −21 DB). In the illustrated example, a portion 302 corresponds to the transmission fiber 202a; a portion 304 corresponds to the transmission fiber 202b; and a portion 306 corresponds to the transmission fiber 202c. FIG. 4 illustrates an example graph 400, that, for each transmission fiber 202, the forward Raman pump module 204 amplifies the optical signal 220 for a first portion 402 of the transmission fiber 202 (e.g., 20-30 kilometers); and the backward Raman pump module 206 amplifies the optical signal 220 for a last portion 404 of the transmission fiber 202 (e.g., 20-30 kilometers).

Referring back to FIG. 2, each forward Raman pump module 204 and each backward Raman pump module 206 can be associated with a respective gain of the optical signal 220. In some examples, the gain of each of the forward Raman pump modules 204 is substantially the same; and the gain of each of the backward Raman pump modules 206 is substantially the same. In some examples, the gain of one or more of the forward Raman pump modules 204 differs from the gain from the remaining forward Raman pump modules 204; and the gain of one or more of the backward Raman pump modules 206 differs from the gain from the remaining backward Raman pump modules 206. In some examples, the forward Raman pump modules 204 avoids relative intensity noise (RIN) from the pump modules 204 to the optical signal 220 by equipping pilot tone with digital signal processing (DSP) RIN mitigation.

The noise matrix computing module 213 can determine, for each forward Raman pump module 204, a noise associated with the one or more gains of the optical signal 220. Similarly, the noise matrix computing module 213 can determine, for each backward Raman pump module 206, a noise associated with one or more gains of the optical signal 220. The noise matrix computing module 213 can generate a noise matrix based on the i) the noise for each gain of the forward Raman pump module 204 and ii) the noise for each gain of the backward Raman pump module 206.

Figure 5:
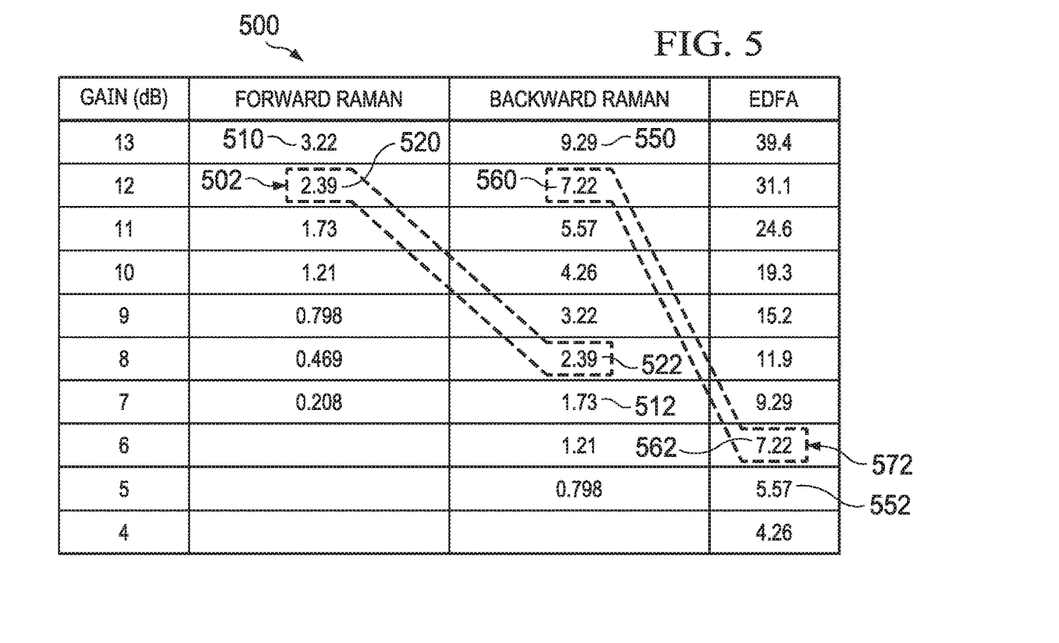
FIG. 5 illustrates a noise matrix for a forward Raman pump module, a backward Raman pump module, and an optical amplifier of the optical system.

Specifically, FIG. 5 illustrates a noise matrix 500 for the forward Raman pump module 204 and the backward Raman pump module 206. The noise matrix 500 illustrates, for a specific gain (dB), the noise generated by the respective forward Raman pump module 204 and the backward Raman pump module 206 for such specific gain. The noise is a linear noise amount ($\times 10^{-9}$).

Referring back to FIG. 2, the noise matrix computing module 213 can identify the span loss of the optical signal 220 as the optical signal 220 is transmitted along the transmission fibers 202. The noise matrix computing module 213 can identify, based on the noise matrix 500, a combination of the gain of the forward Raman pump module 204 and the backward Raman pump module 206 to compensate for the span loss. Specifically, for each transmission fiber 202, a combination of the gain for the forward Raman pump module 204 and the backward Raman pump module 206 for that transmission fiber 202 compensates for the span loss of the optical signal 220 as the optical signal 220 is transmitted down the transmission fiber 202. Furthermore, for the particular transmission fiber 202, a gain ratio between the gain of the forward Raman pump module 204 and the gain of the backward Raman pump module 206 is determined for a smallest accumulated noise of the optical signal 220 based on the noise matrix 500. In other words, the gain ratio between the gain of the forward Raman pump module 204 and the gain of the backward Raman pump module 206 is determined such that the accumulated noise is minimized while compensating for the span loss of the optical signal 220 as the optical signal is transmitted along the transmission fiber 202.

Figure 6:
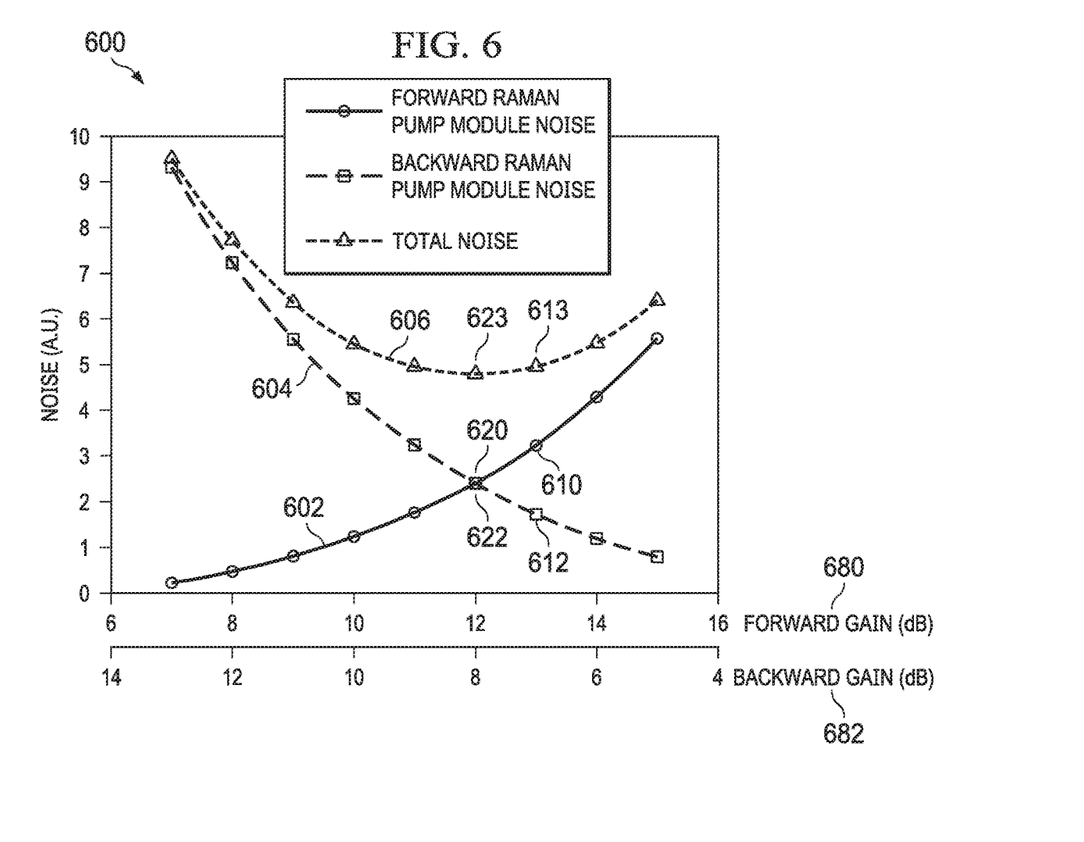
FIG. 6 is a graph illustrating the noise for the forward Raman pump module and the backward Raman pump module of the optical system.

For example, FIG. 6 illustrates a graph 600 graphically illustrating the noise, per the matrix 500, for the forward Raman pump module 204, the backward Raman pump module 206, and a total noise (combination of the noise of the forward Raman pump module 204 and the backward Raman pump module 206). Specifically, the graph 600 illustrates the noise, per the matrix 500, for each combination of gain values for a particular total gain (based on the span loss of the optical signal 220). For example, for a span loss of 20 dB, the graph 600 illustrates the combination of gain values of the forward Raman pump module 204 (indicated by axis 680) and of the backward Raman pump module 206 (indicated by axis 682) such that the total gain is equal to or approximate to the span loss of 20 dB. That is, for the noise associated with each gain value of the forward Raman pump module 204 displayed by the graph 600, shown by line 602, the noise for the corresponding gain value of the backward Raman pump module 206 is displayed by the graph 600, shown by line 604, that results in the total noise, shown by line 606. For example, the graph 600 illustrates the noise for a first gain value combination of 13 dB for the forward Raman pump module 204 (shown by point 610 for corresponding value 510 of the matrix 500) and 7 dB for the backward Raman pump module 206 (shown by point 612 for corresponding value 512 of the matrix 500) for a total gain of 20 dB (13 dB for the forward Raman pump module 204 and 7 dB for the backward Raman pump module 206). The total noise for the first gain value combination (associated with points 610 and 612) is shown at point 613 for the noise associated with a 13 dB gain for the forward Raman pump module 204 and 7 dB gain for the backward Raman pump module 206. For example, the graph 600 illustrates the noise for a second gain value combination of 12 dB for the forward Raman pump module 204 (shown by point 620 for corresponding value 520 of the matrix 500) and 8 dB for the backward Raman pump module 206 (shown by point 622 for corresponding value 522 of the matrix 500) for a total gain of 20 dB (12 dB for the forward Raman pump module 204 and 8 dB for the backward Raman pump module 206). The total noise for the second gain value combination (associated with points 620 and 622) is shown at point 623 for the noise associated with a 12 dB gain for the forward Raman pump module 204 and 8 dB gain for the backward Raman pump module 206. The graph 600 illustrates further total noise for gain value combinations such as 11 dB for the forward Raman pump module 204 and 9 dB for the backward Raman pump module 206, and so forth.

To that end, the noise matrix computing module 213 identifies, based on the noise matrix 500 and the graph 600, for a span loss of 20 dB, the combination of 12 dB gain for the forward Raman pump module 204 and 8 dB gain for the backward Raman pump module 206, shown as 502, that minimizes the accumulated noise of the optical signal 220 (e.g., the lowest total noise as indicated by line 606). For example, the noise associated with the 12 dB gain for the forward Raman pump module 204 is $2.39 \times 10^{-9}$ and the noise associated with the 8 dB gain for the backward Raman pump module 206 is $2.39 \times 10^{-9}$, resulting in a total noise of $4.78 \times 10^{-9}$, which it the minimized noise for a 20 dB gain that compensates for the span loss of 20 dB of the optical signal 220 as the optical signal 220 is transmitted along the transmission fiber 202.

Furthermore, the optical amplifier 212 can be associated with a gain of the optical signal 220. In some examples, the optical amplifier 212 is an erbium-doped fiber amplifier (EDFA). Referring back to FIG. 3, graph 300 illustrates a gain of the optical signal 220 proximate to an end portion 310 of the transmission fiber 202c. Specifically, the receiver 210 can be associated with a receiver sensitivity, e.g., 10 dB. At the receiver 210, the optical signal 220 can be transferred to an electrical signal, with the optical amplifier 212 increasing the gain of the optical signal 220 to facilitate such transformation. In some examples, the optical amplifier 212 is a phase sensitive amplifier.

The noise matrix computing module 213 can determine, for the optical amplifier 212, a noise associated with the one or more gains of the optical signal 220. The noise matrix computing module 213 can generate the noise matrix based on the i) the noise for each gain of the forward Raman pump module 204, ii) the noise for each gain of the backward Raman pump module 206, and iii) the noise for each gain of the optical amplifier 212. Specifically, FIG. 5 illustrates the noise matrix 500 for the forward Raman pump module 204, the backward Raman pump module 206, and the optical amplifier 212. The noise matrix 500 illustrates, for a specific gain (dB), the noise generated by the respective forward Raman pump module 204, the backward Raman pump module 206, and the optical amplifier 212 for such specific gain. The noise is a linear noise amount ($\times 10^{-9}$).

The noise matrix computing module 213 can identify the receiver sensitivity of the receiver 210. The noise matrix computing module 213 can identify, based on the noise matrix 500, a combination of the gain of the backward Raman pump module 206 and the gain of the optical amplifier 212 to compensate for the receiver sensitivity of the receiver 210. Specifically, for the transmission fiber 202c, a combination of the gain for the backward Raman pump module 206c and the gain for the optical amplifier 212 compensates for the receiver sensitivity. Furthermore, for the transmission fiber 202c, a gain ratio between the gain of the backward Raman pump module 206 and the gain of the optical amplifier 212 is determined for a smallest accumulated noise of the optical signal 220 based on the noise matrix 500. In other words, for the particular transmission fiber 202c, a gain ratio between the gain of the backward Raman pump module 206c and the gain of the optical amplifier 212 is determined such that the accumulated noise of the optical signal 220 is minimized while compensating for the receiver sensitivity.

Figure 7:
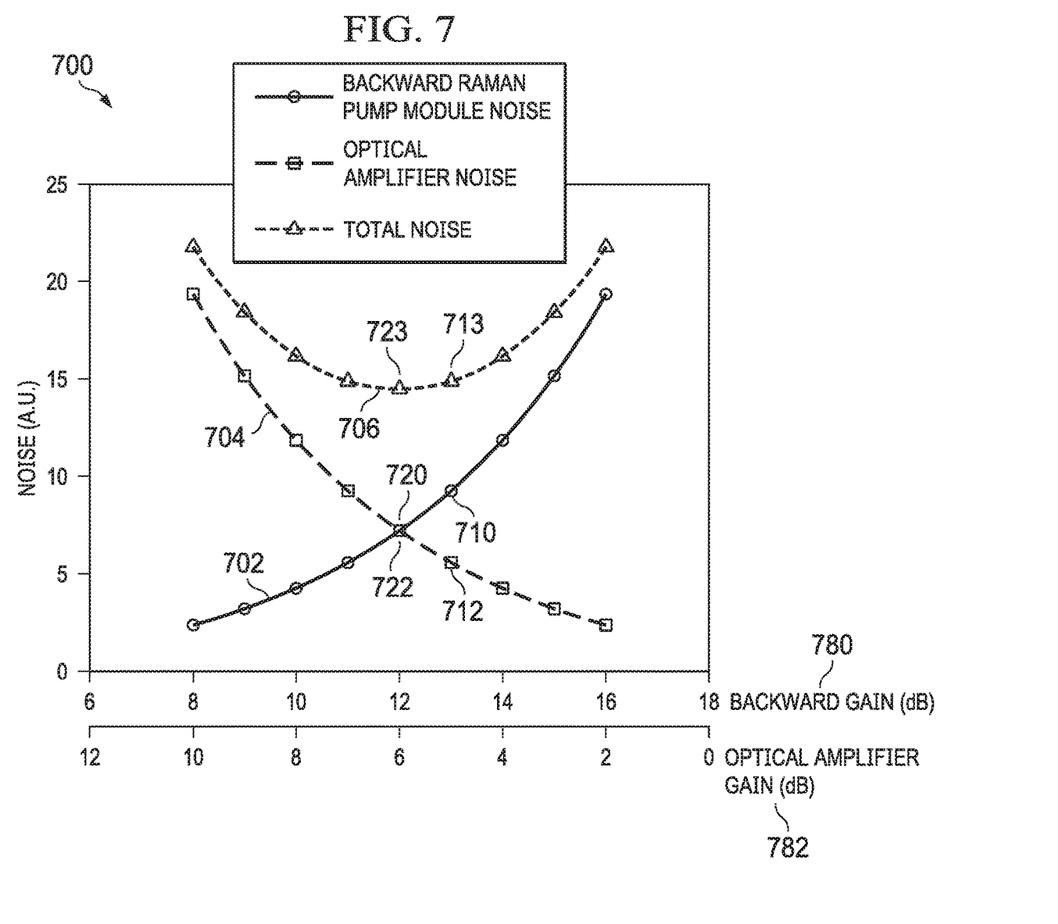
FIG. 7 is a graph illustrating the noise for the backward Raman pump module and the optical amplifier of the optical system.

For example, FIG. 7 illustrates a graph 700 graphically illustrating the noise, per the matrix 500 of FIG. 5, for the backward Raman pump module 206c, the optical amplifier 212, and a total noise (combination of the noise of the backward Raman pump module 206c and the optical amplifier 212). Specifically, the graph 700 illustrates the noise, per the matrix 500, for each combination of gain values for a particular total gain (based on the receiver sensitivity of the receiver 210). As determined previously, the forward Raman pump module 202c has a gain of 12 dB (based on the span loss of the optical signal 220). To that end, the gain of the backward Raman pump module 206c and the optical amplifier 212 is the remaining gain needed based on the total gain (i.e., the total gain being the span loss of the optical signal 220 and the receiver sensitivity of the receiver 210). For example, when the span loss is 20 dB and the receiver sensitivity is 10 dB, the total gain needed for the transmission fiber 206c is 30 dB. The forward Raman pump module 202c is associated with a gain of 12 dB, and thus, the remaining gain needed to be provided by the backward Raman pump module 206c and the optical amplifier 212 is 18 dB.

That is, for the noise associated with each gain value of the backward Raman pump module 206 displayed by the graph 700, shown by line 702, the noise for the corresponding gain value of the optical amplifier 212 is displayed by the graph, shown by line 704, that results in the total noise, shown by line 706. For example, for a remaining total gain of 18 dB, the graph 700 illustrates the combination of gain values of the backward Raman pump module 206c (shown by axis 780) and of the optical amplifier 212 (shown by axis 782) such that the total gain is equal to or approximate the remaining total gain of 18 dB. For example, the graph 700 illustrates the noise for a first gain value combination of 13 dB for the backward Raman pump module 206*c* (shown by point 710 for corresponding value 550 of the matrix 500) and 5 dB for the optical amplifier 212 (shown by point 712 for corresponding value 552 of the matrix 500) for a total gain of 18 dB (13 dB for the backward Raman pump module 206*c* and 5 dB for the optical amplifier 212). The total noise for the first gain value combination (associated with points 710 and 712) is shown at point 713 for the noise associated with a 13 dB gain for the backward Raman pump module 206*c* and 5 dB gain for the optical amplifier 212. For example, the graph 600 illustrates the noise for a second gain value combination of, 12 dB for the backward Raman pump module 206*c* (shown by point 720 for corresponding value 560 of the matrix 500) and 6 dB for the optical amplifier 212 (shown by point 722 for corresponding value 562 of the matrix 500) for a total gain of 18 dB (12 dB for the backward Raman pump module 206*c* and 6 dB for the optical amplifier 212. The total noise for the second gain value combination (associated with points 720 and 722) is shown at point 723 for the noise associated with a 12 dB gain for the backward Raman pump module 206*c* and 6 dB gain for the optical amplifier 212. The graph 700 illustrates further gain value combinations such as 11 dB for the backward Raman pump module 206*c* and 7 dB for the optical amplifier 212, and so forth.

To that end, the noise matrix computing module 213 identifies, based on the noise matrix 500 and the graph 700, for a remaining total gain of 18 dB, the combination 12 dB gain for the backward Raman pump module 206*c* and 6 dB gain for the optical amplifier 212, shown as 572, that minimizes the accumulated noise of the optical signal 220 (e.g., the lowest total noise as indicated by line 706). For example, the noise associated with the 12 dB gain for the backward Raman pump module 206*c* is $7.22 \times 10^{-9}$ and the noise associated with the 6 dB gain for the optical amplifier 212 is $7.22 \times 10^{-9}$, resulting a total noise of $14.44 \times 10^{-9}$, which is the minimized noise for a 18 dB remaining total gain that compensates for at least a portion of the span loss of the optical signal 220 and the receiver sensitivity of the receiver 210.

In some examples, for the transmission fiber 202*a*, the combination of the gain for the forward Raman pump module 204*a* and the backward Raman pump module 206*a* compensates for the span loss of the optical signal 220 along the transmission fiber 202*a*. Furthermore, for the transmission fiber 202*a*, a gain ratio between the gain of the forward Raman pump module 204*a* and the gain of the backward Raman pump module 206*a* is determined such that an accumulated noise of the optical signal 220 along the transmission fiber 202*a* is minimized while compensating for the span loss of the optical signal 220 as the optical signal 220 is transmitted along the transmission fiber 202*a*. As shown by the noise matrix 500, when the span loss is 20 dB along the transmission fiber 202*a*, the combination of 12 dB gain for the forward Raman pump module 204*a* and 8 dB gain for the backward Raman pump module 206*a* compensates for the span loss of 20 dB while minimizing the accumulated noise of the optical signal 220.

For the transmission fiber 202*b*, the combination of the gain for the forward Raman pump module 204*b* and the backward Raman pump module 206*b* compensates for the span loss of the optical signal 220 along the transmission fiber 202*b*. Furthermore, for the transmission fiber 202*b*, a gain ratio between the gain of the forward Raman pump module 204*b* and the gain of the backward Raman pump module 206*a* is determined such that an accumulated noise of the optical signal 220 along the transmission fiber 202*b* is minimized while compensating for the span loss of the optical signal 220 as the optical signal 220 is transmitted along the transmission fiber 202*b*. As shown by the noise matrix 500, when the span loss is 20 dB along the transmission fiber 202*b*, the combination of 12 dB gain for the forward Raman pump module 204*b* and 8 dB gain for the backward Raman pump module 206*b* compensates for the span loss of 20 dB while minimizing the accumulated noise of the optical signal 220.

For the transmission fiber 202*c*, a combination of the gain for the forward Rampa pump module 204*c*, the backward Raman pump module 206*c*, and the optical amplifier 212 compensates for the span loss of the optical sign 220 along the transmission fiber 202*c* and the receiver sensitivity of the receiver 210. Furthermore, for the transmission fiber 202*c*, a gain ratio between the gain of the forward Raman pump module 204*c* and the gain of the backward Raman pump module 206*c*; and a gain ratio between the gain of the backward Raman pump module 206*c* and the gain of the optical amplifier 212 is determined such that the accumulated noise of the optical signal 220 is minimized while compensating for the span loss of the optical signal 220 as the optical signal 220 is transmitted along the transmission fiber 202*c* and the receiver sensitivity of the receiver 210. As shown by the noise matrix 500, when the span loss is 20 dB along the transmission fiber 202*b* and the receiver sensitivity of the receiver 210 is 10 dB, the combination of 12 dB gain for the forward Raman pump module 204*c*, 12 dB gain for the backward Raman pump module 206*c*, and 6 dB gain for the optical amplifier compensates for the span loss of 20 dB and receiver sensitivity of 10 dB while minimizing the accumulated noise of the optical signal 220.

Figure 8:
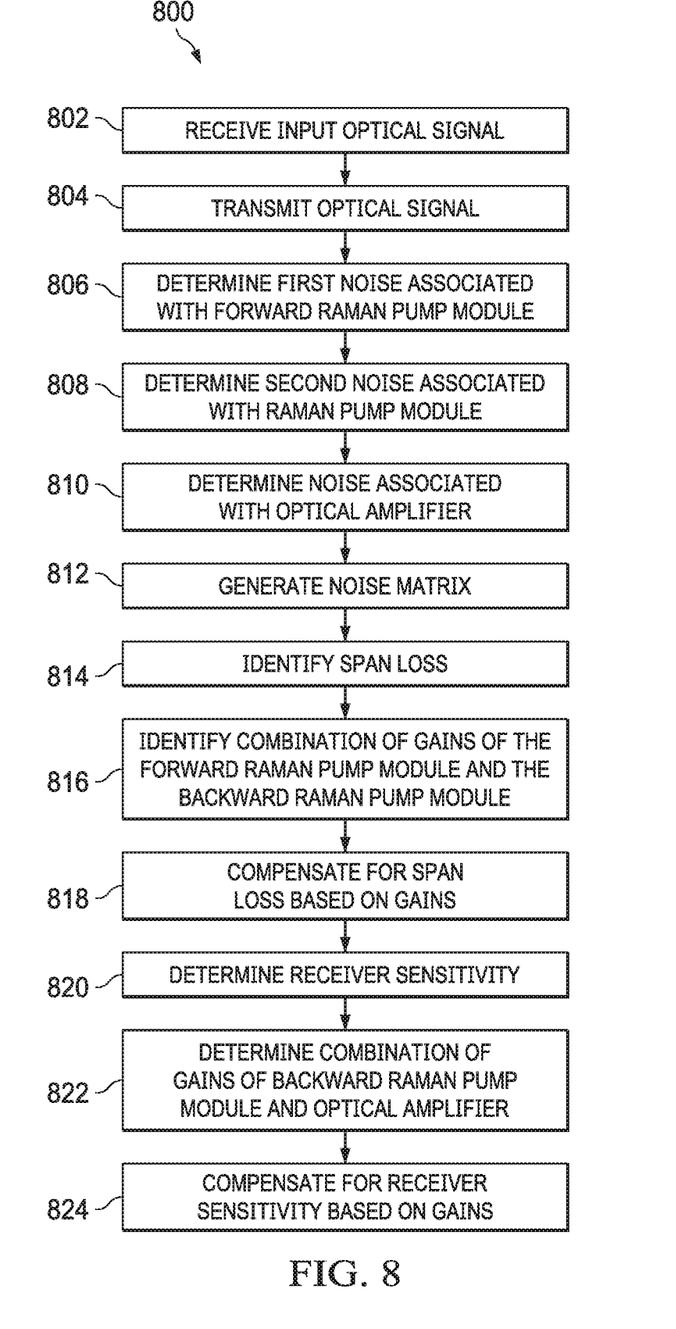
FIG. 8 is a flowchart for compensating for signal loss in the optical system.

FIG. 8 illustrates a flowchart depicting selected elements of an embodiment of a method 800 for compensating for signal loss. The method 800 may be performed by the optical system 200. It is noted that certain operations described in method 800 may be optional or may be rearranged in different embodiments.

The WDM input optical signal 220 is received (802). The optical signal 220 is transmitted along the transmission fiber 202 (804). The noise matrix computing module 213 determines, for one or more first gains of the optical signal 220, a first noise associated with the first gain of the forward Raman pump module 204 (806). The noise matrix computing module 213 determines, for one or more second gains of the optical signal 220, a second noise associated with the second gain of the backward Raman pump module 206 (808). The noise matrix computing module 213 determines, for one or more third gains of the optical signal 220, a third noise associated with the third gain of the optical amplifier 212 (810). The noise matrix computing module 213 generates the noise matrix 500 based on i) the first noise for each gain of the forward Raman pump module 204, ii) the second noise for each gain of the backward Raman pump module 206, and iii) the third noise for each gain of the optical amplifier 212 (812). The noise matrix computing module 213 identifies a span loss of the optical signal 220 as the optical signal 220 is transmitted along the transmission fiber 202 (814). The noise matrix computing module 213 identifies, based on the noise matrix 500 and the span loss, a combination of a particular first gain of the forward Raman pump module 204 and a particular second gain of the backward Raman pump module 206 (816). The forward Raman pump module 204 and the backward Raman pump module 206 compensate for the span loss of optical signal 220 based on the particular first gain and the particular second gain, respectively (818). In some cases, a gain ratio between the particular first gain of the forward Raman pump module 204 and the particular second gain of the backward Raman pump module 206 includes a smallest accumulated noise combination of the first noise and the second noise of the optical signal 220 based on the noise matrix 500. The noise matrix computing module 213 determines a receiver sensitivity of the receiver 210 (820). The noise matrix computing module 213 identifies, based on the noise matrix 500 and the receiver sensitivity, a combination of a particular second gain of the backward Raman pump module 206 and a particular third gain of the optical amplifier 212 (822). In some cases, a gain ratio between the particular second gain of the backward Raman pump module 206 and the particular third gain of the optical amplifier 210 includes a smallest accumulated noise combination of the second noise and the third noise of the optical signal 220 based on the noise matrix 500. The backward Raman pump module 206 and the optical amplifier compensate for the receiver sensitivity based on the particular second gain and the particular third gain, respectively (824).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An optical system for compensating for signal loss, comprising:
    a transmission fiber to transmit a WDM input optical signal;
    a forward Raman pump module positioned along the transmission fiber;
    a backward Raman pump module positioned along the transmission fiber; and
    a noise matrix computing module configured to:
        determine, for one or more first gains of the optical signal, a first noise associated with the first gain of the forward Raman pump;
        determine, for one or more second gains of the optical signal, a second noise associated with the second gain of the backward Raman pump module;
        generate a noise matrix based on i) the first noise for each first gain of the forward Raman pump module and ii) the second noise for each second gain of the backward Raman pump module;
        identify a span loss of the optical signal as the optical signal is transmitted along the transmission fiber; and
        identify, based on the noise matrix and the span loss, a combination of a particular first gain of the forward Raman pump module and a particular second gain of the backward Raman pump module,
    wherein the forward Raman pump module and the backward Raman pump module compensate for the span loss of the optical signal based on the combination of the particular first gain of the forward Raman pump module and the particular second gain of the backward Raman pump module,
    wherein a gain ratio between the particular first gain of the forward Raman pump module and the particular second gain of the backward Raman pump module includes a smallest accumulated noise combination of the first noise and the second noise of the optical signal based on the noise matrix.

2. The optical system of claim 1, further comprising:
    an optical amplifier positioned along the transmission fiber; and
    a receiver configured to receive the optical signal,
    wherein the noise matrix computing module is further configured to:
        determine, for one or more third gains of the optical signal, a third noise associated with the third gain of the optical amplifier;
        generate the noise matrix based on i) the first noise for each first gain of the forward Raman pump module, ii) the second noise for each second gain of the backward Raman pump module, and ii) the third noise for each third gain of the optical amplifier;
        identify a receiver sensitivity of the receiver; and
        identify, based on the noise matrix and the receiver sensitivity, a combination of a particular second gain of the backward Raman pump module and a particular third gain of the optical amplifier;
    wherein the backward Raman pump module and the optical amplifier compensate for the receiver sensitivity of the receiver based on the combination of the particular second gain of the backward Raman pump module and the particular third gain of the optical amplifier.

3. The optical system of claim 2, wherein a gain ratio between the particular second gain of the backward Raman pump module and the particular third gain of the optical amplifier includes a smallest accumulated noise combination of the second noise and the third noise of the optical signal based on the noise matrix.

4. The optical system of claim 2, wherein the optical amplifier is an EDFA.

5. The optical system of claim 1, further comprising:
an additional transmission fiber to transmit the optical signal;
an additional forward Raman pump module positioned along the additional transmission fiber; and
an additional backward Raman pump module positioned along the additional transmission fiber,
wherein the noise matrix computing module is further configured to:
  determine, for one or more third gains of the optical signal, a third noise associated with the third gain of the additional forward Raman pump;
  determine, for one or more fourth gains of the optical signal, a fourth noise associated with the fourth gain of the additional backward Raman pump module;
  generate the noise matrix based on i) the third noise for each third gain of the additional forward Raman pump module and ii) the fourth noise for each fourth gain of the additional backward Raman pump module;
  identify an additional span loss of the optical signal as the optical signal is transmitted along the additional transmission fiber;
  identify, based on the noise matrix and the additional span loss, a combination of a particular third gain of the additional forward Raman pump module and a particular fourth gain of the additional backward Raman pump module;
wherein the additional forward Raman pump module and the additional backward Raman pump module compensate for the additional span loss of optical signal based on the combination of the particular third gain of the additional forward Raman pump module and the particular fourth gain of the additional backward Raman pump module,
wherein a gain ratio between the particular third gain of the additional forward Raman pump module and the particular fourth gain of the additional backward Raman pump module includes a smallest accumulated noise combination of the third and the fourth noise of the optical signal based on the noise matrix.

6. The optical system of claim 5, further comprising:
an optical amplifier positioned along the additional transmission fiber; and
a receiver configured to receive the optical signal,
wherein the noise matrix computing module is further configured to:
  determine, for one or more fifth gains of the optical signal, a fifth noise associated with the fifth gain of the optical amplifier;
  generate the noise matrix based on i) the third noise for each third gain of the additional forward Raman pump module, ii) the fourth noise for each fourth gain of the additional backward Raman pump module, and ii) the fifth noise for each gain of the optical amplifier;
  identify a receiver sensitivity of the receiver; and
  identify, based on the noise matrix and the receiver sensitivity, a combination of a particular third gain of the additional backward Raman pump module and a particular fifth gain of the optical amplifier;
wherein the additional backward Raman pump module and the optical amplifier compensate for the receiver sensitivity of the receiver based on the combination of the third gain of the additional backward Raman pump module and the fifth gain of the optical amplifier.

7. The optical system of claim 6, wherein a gain ratio between the particular third gain of the additional backward Raman pump module and the particular fifth gain of the optical amplifier includes a smallest accumulated noise combination of the third noise and the fifth noise of the optical signal based on the noise matrix.

8. The optical system of claim 1, wherein the span loss is approximately 20 dB.

9. The optical system of claim 2, wherein the receiver sensitivity is approximately 10 dB.

10. A method for compensating for signal loss in an optical network, comprising:
receiving a WDM input optical signal;
transmitting the optical signal along a transmission fiber;
determining, for one or more first gains of the optical signal, a first noise associated with the first gain of a forward Raman pump module positioned along the transmission fiber;
determining, for one or more second gains of the optical signal, a second noise associated with the second gain of a backward Raman pump module positioned along the transmission fiber;
generating a noise matrix based on i) the first noise for each first gain of the forward Raman pump module and ii) the second noise for each second gain of the backward Raman pump module;
identifying a span loss of the optical signal as the optical signal is transmitted along the transmission fiber;
identifying, based on the noise matrix and the span loss, a combination of a particular first gain of the forward Raman pump module and a particular second gain of the backward Raman pump module; and
compensating for the span loss of the optical signal based on the particular first gain of the forward Raman pump module and the particular second gain of the backward Raman pump module,
wherein a gain ratio between the particular first gain of the forward Raman pump module and the particular second gain of the backward Raman pump module includes a smallest accumulated noise combination of the first noise and the second noise of the optical signal based on the noise matrix.

11. The method of claim 10, further comprising:
determining, for one more third gains of the optical signal, a third noise associated with the third gain of an optical amplifier positioned along the transmission fiber;
generating the noise matrix based on i) the first noise for each first gain of the forward Raman pump module, ii) the second noise for each second gain of the backward Raman pump module, and iii) the third noise for each third gain of the optical amplifier;
identifying a receiver sensitivity of a receiver configured to receive the optical signal;
identifying, based on the noise matrix and the receiver sensitivity, a combination of a particular second gain of the backward Raman pump module and a particular third gain of the optical amplifier;
compensating for the receiver sensitivity of the receiver based on the particular second gain of the backward Raman pump module and the particular third gain of the optical amplifier.

12. The method of claim 10, wherein a gain ratio between the particular second gain of the backward Raman pump module and the particular third gain of the optical amplifier includes a smallest accumulated noise combination of the second noise and the third noise of the optical signal based on the noise matrix.

13. The method of claim 12, wherein the optical amplifier is an EDFA.

14. The method of claim 10, further comprising:
transmitting the optical signal along an additional transmission fiber;
determining, for one or more third gains of the optical signal, a third noise associated with the third gain of an additional forward Raman pump module positioned along the transmission fiber;
determining, for one or more fourth gains of the optical signal, a fourth noise associated with the fourth gain of an additional backward Raman pump module positioned along the transmission fiber;
generating the noise matrix based on i) the third noise for each third gain of the additional forward Raman pump module and ii) the fourth noise for each fourth gain of the additional backward Raman pump module;
identifying an additional span loss of the optical signal as the optical signal is transmitted along the additional transmission fiber;
identifying, based on the noise matrix and the additional span loss, a combination of a particular third gain of the additional forward Raman pump module and a particular fourth gain of the additional Raman pump module;
compensating for the additional span loss of the optical signal based on the particular third gain of the additional forward Raman pump module and the particular fourth gain of the additional Raman pump module,
wherein a gain ratio between the particular third gain of the additional forward Raman pump module and the particular fourth gain of the additional backward Raman pump module includes a smallest accumulated noise combination of the third and the fourth noise of the optical signal based on the noise matrix.

15. The method of claim 14, further comprising:
determining, for one or more fifth gains of the optical signal, a fifth noise associated with the fifth gain of an optical amplifier positioned along the additional transmission fiber;
generating the noise matrix based on i) the third noise for each gain of the additional forward Raman pump module, ii) the fourth noise for each gain of the additional backward Raman pump module, and iii) the fifth noise for each gain of the optical amplifier;
identifying a receiver sensitivity of a receiver that receives the optical signal;
identifying, based on the noise matrix, a combination of a particular third gain of the additional backward Raman pump module and a particular fifth gain of the optical amplifier; and
compensating for the receiver sensitivity of the receiver based on the particular third gain of the additional backward Raman pump module and the particular fifth gain of the optical amplifier.

16. The method of claim 15, wherein a gain ratio between the particular third gain of the additional backward Raman pump module and the particular fifth gain of the optical amplifier includes a smallest accumulated noise combination of the third and the fifth noise of the optical signal based on the noise matrix.

17. The method of claim 10, wherein the span loss is approximately 20 dB.

18. The method of claim 11, wherein the receiver sensitivity is approximately 10 dB.

* * * * *